United States Patent [19]

Tomii et al.

[11] Patent Number: 5,062,730
[45] Date of Patent: Nov. 5, 1991

[54] UNIVERSAL JOINT

[75] Inventors: Hiroyasu Tomii, Kawaguchi; Yukio Kaneko, Yono, both of Japan

[73] Assignees: Nippon Piston Ring Co., Ltd.; Kay Seven Co., Ltd., both of Tokyo, Japan

[21] Appl. No.: 563,388

[22] Filed: Aug. 7, 1990

[30] Foreign Application Priority Data

Aug. 14, 1989 [JP] Japan .................................. 1-207897

[51] Int. Cl.⁵ .............................................. F16D 3/00
[52] U.S. Cl. ..................................... 403/57; 464/132
[58] Field of Search ..................... 403/57, 58; 464/132, 464/134, 136

[56] References Cited

U.S. PATENT DOCUMENTS

| | | | |
|---|---|---|---|
| 1,897,945 | 2/1933 | Dooley | 464/136 |
| 4,272,972 | 6/1981 | James | 464/134 X |
| 4,365,488 | 12/1982 | Mochida et al. | 403/57 X |
| 4,472,158 | 9/1984 | Joyner | 464/134 |

FOREIGN PATENT DOCUMENTS 2135425  8/1984  United Kingdom ............... 464/136

*Primary Examiner*—Andrew V. Kundrat
*Attorney, Agent, or Firm*—Sughrue, Mion, Zinn, Macpeak & Seas

[57] ABSTRACT

A universal joint having two joint bodies coupled together by a coupling member. Each of the joint bodies has a cylindrical hub portion and a pair of yoke portions provided integral with the hub portion by sintering, casting, or injection molding (die casting). The yokes are formed with bearing holes with which sleeve members are force-fittable. The coupling member has a rectangular segment formed with holes and separate pins force-fittable with the holes of the segment. Each of the pins is slidably inserted into each of the sleeve members fitted with the bearing holes, and extends into each of the holes of the rectangular segment.

3 Claims, 2 Drawing Sheets

UNIVERSAL JOINT

BACKGROUND OF THE INVENTION

The present invention relates to a universal joint, and more particularly to an improvement on a variable speed type universal joint available for being operated under a relatively small offsetting angle and eccentricity.

A compact variable speed type universal joint capable of being used under an eccentrical condition and eccentrical angle is generally referred to as a hook or Cardan joint. Such a conventional universal joint includes a pair of joint bodies each provided with a yoke, and a coupling member or a spider having a cruciform configuration for coupling together the joint bodies. For this, the coupling member is provided with pins which constitute, in combination, the cruciform shape, and these pins extend through and are slidingly engageable with the yokes.

Japanese Patent Application Kokai No. 62-110630 discloses such a conventional universal joint as shown in FIG. 1. According to the conventional structure, a coupling member 15 includes a rectangular segment 16 and four pins 17 those being separate from the rectangular segment and fixable thereto. Further, joint bodies 11 and 21 include hub portions 11a, 21a, and yoke pieces 13,13 and 23, 23 those formed with holes and separate from the hub portions and fixable thereto by bolts 20. For assembly, firstly, the four pins 17 are fixedly secured to the rectangular segment 16 so as to constitute the coupling member 15 having cruciform shape, and then, the holes of the yokes 13,13 and 23 23 are engaged with the pins 17. Thereafter, the yokes 13, 13 and 23, 23 are fixedly secured to the hubs 11a, 21a by the bolts 20. Sleeve members (not shown) may be interposed between the pins 17 and holes of the yokes 13, 23.

With the above conventional arrangement, after the pins 17 are secured to the rectangular segment 16, the pins 17 must undergo grinding for providing smooth sliding contact with the holes of the yokes, since the pins may be deformed at the time of fixing work to the rectangular segment. However, the intricate machining may be required, and it would be rather difficult to obtain high dimensional accuracy, which then leads to increase in production cost. Furthermore, the yokes 13 13 and 23 23 are initially separate from the hubs 11a and 21a, and therefore, minute assembly error may result. If the fixing between the hubs and the yokes is made with a minute dimensional error, the inherent power transmitting function of the universal joint may be degraded. To avoid this, fine surface accuracies are required at surface engagement portions of the yokes and hubs, and thread holes formed in the hubs and yokes for engagements with the bolts 20 must also provide high accuracy. Accordingly production cost of the joint bodies 11 and 21 may be increased.

SUMMARY OF THE INVENTION

It is therefore, an object of the present invention to overcome the above described drawbacks, and to provide an improved universal joint which facilitates its assembling work, with providing high dimensional accuracy.

Another object of the invention is to provide such a universal joint which is constituted by reduced numbers of mechanical segments or components.

Still another object of the invention is to provide the universal joint providing sufficient power transmission efficiency because of high assembling accuracy.

These and other objects of the invention will be attained by a universal joint including a first joint body provided with a first cylindrical hub portion and a first yoke portion, a second joint body provided with a second cylindrical hub portion and a second yoke portion, and a coupling member for coupling together the first and the second yoke portions therethrough, and the improvement comprising the first and second yoke portions being provided integral with the first and second hub portions, respectively, and extending from diametrically opposite sides of the hub portions toward each other in axial direction thereof, the first and second yoke portions being formed with first and second pairs of bearing holes, first and second pairs of sleeve members force-fittable with the first and second pairs of bearing holes, respectively, the coupling member comprising a rectangular segment having four side walls formed with holes, and four pins provided separately from the rectangular segment prior to assembly and forcibly fittable with the corresponding holes to provide the coupling member with a cruciform configuration upon assembly, each of the pins being slidingly engageable with each of the sleeve members. With the structure, the first and second joint bodies are coupled together by the coupling member.

BRIEF DESCRIPTION OF THE INVENTION

DETAILED DESCRIPTION OF THE PREFERRED EMBODIMENT

Figure 2:
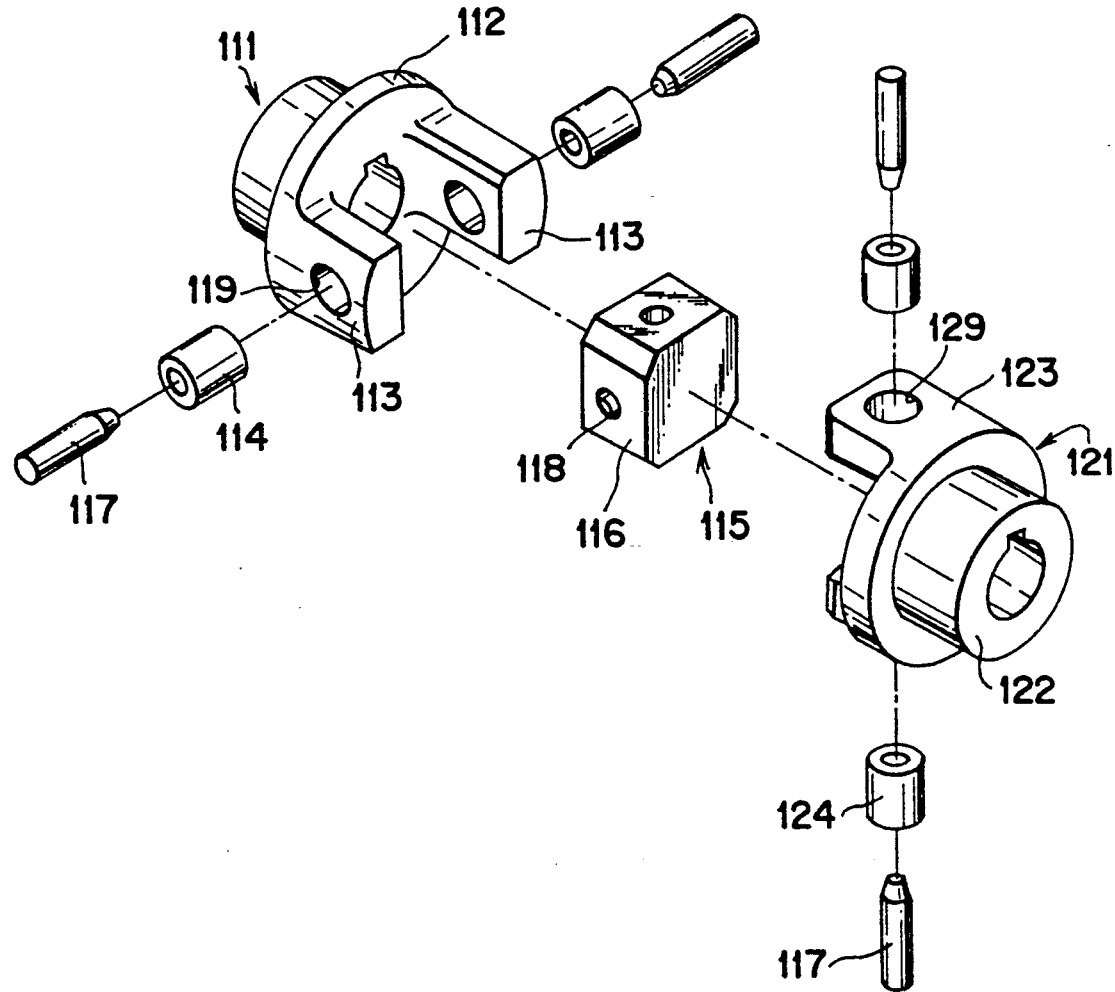
FIG. 2 is an exploded perspective view showing a universal joint according to one embodiment of the present invention.

A universal joint according to one embodiment of this invention will be described with reference to FIGS. 2 and 3.

Figure 3:
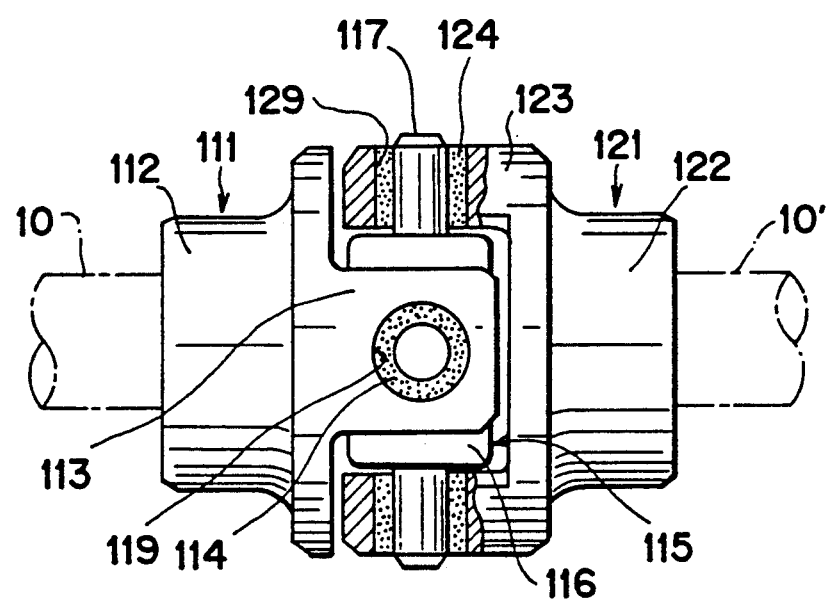
FIG. 3 is a front view showing the universal joint according to the embodiment of this invention.

As shown in FIG. 3, a pair of joint bodies 111 and 121 include cylindrical hub portions 112 and 122 and yoke portions 113 and 123. The hub portions 112 and 122 are coupled to a drive shaft 10 and a driven shaft 10', respectively. The yokes 113 and 123 extend toward each other from diametrically opposite sides of the hubs 112 and 122, respectively and in axial directions thereof. In the present invention, the yoke portions are provided integral with the corresponding hub portions by way of sintering, casting or injection molding such as a die-casting. The yoke portions 113 and 123 are formed with first and second pairs of bearing holes 119 and 129 respectively extending in radial directions of the hub portions.

A first pair of sleeve members 114 and a second pair of sleeve members 124 those formed of oil-less metal are provided force-fittable with the first and second pairs of bearing holes 119 and 129, respectively.

A coupling member or a spider 115 includes a rectangular segment 116 and four pins 117. The rectangular segment 115 has chamfered four corner portions and four side portions each of whose center portions is formed with corresponding pin holes 118. The four pins 117 are implantable with the associated pin holes 118.

Upon implantation of the pins into the rectangular segment 116, the resultant coupling member 115 has a cruciform configuration. Further, outer diameters of the pins 117 are smaller than inner diameters of the sleeve members 114 and 124. Therefore, protruded parts of the pins 117 are slidingly engageable with the sleeve members 114 and 124.

For an assembly of the universal joint according to this invention, firstly, the first and second pairs of sleeve members 114 and 124 are force-fitted with the first and second pairs of bearing holes 119 and 129 of the yokes 113 and 123, respectively. Then, the pins 117 are slidingly inserted into the sleeve members 114 and 124 from radially outer sides of the hub portions. Thereafter, the rectangular segment 116 is positioned between opposing yokes 113, 113 so that its pin holes 118 are in alignment with the pins 117. By using a pressing machine, radially inner ends of the pins 117 are forcibly inserted into the pin holes 118. Accordingly, the joint body 111 is coupled to the rectangular segment 116 by means of the pins 117 which extend through the sleeve members 114. Next, the second joint body 121 is positioned over the rectangular segment 116 so that the pins 117 slidably inserted into the second pair of sleeve member 124 are in alignment with the remaining pin holes 118. Thereafter, the pins 117 are forcibly inserted into the pin holes 118 by the pressing machine to complete the assembly. Upon completion of the assembly, the rectangular segment 115 is implanted with the four pins 117 so as to constitute the coupling body 115 having a cruciform configuration. Simultaneously, the pair of joint bodies 111 and 121 are coupled to the coupling member 115.

When the rotation shafts 10 and 10' are coupled to hub portions 111 and 121, respectively, and the shaft 10 is rotated, its rotation is transmitted to the other rotation shaft 10' through the first joint body 111, the coupling member 115 and the second joint body 121. In this case, even if the drive and driven shafts 10 and 10' are eccentrically arranged or are in offset relation, this eccentricity can be absorbed because of the sliding relationship between the pins 117 and the sleeve members 114, 124. Further, even if the drive and driven shafts 10 and 10' are not linearly aligned with each other but are angularly arranged, this arrangement can be absorbed by the rotations of the pins 117 about their axes within the sleeve members 114, 124. Consequently, sufficient power transmission is attainable even by the eccentrical and angular arrangement between two shafts.

Figure 1:
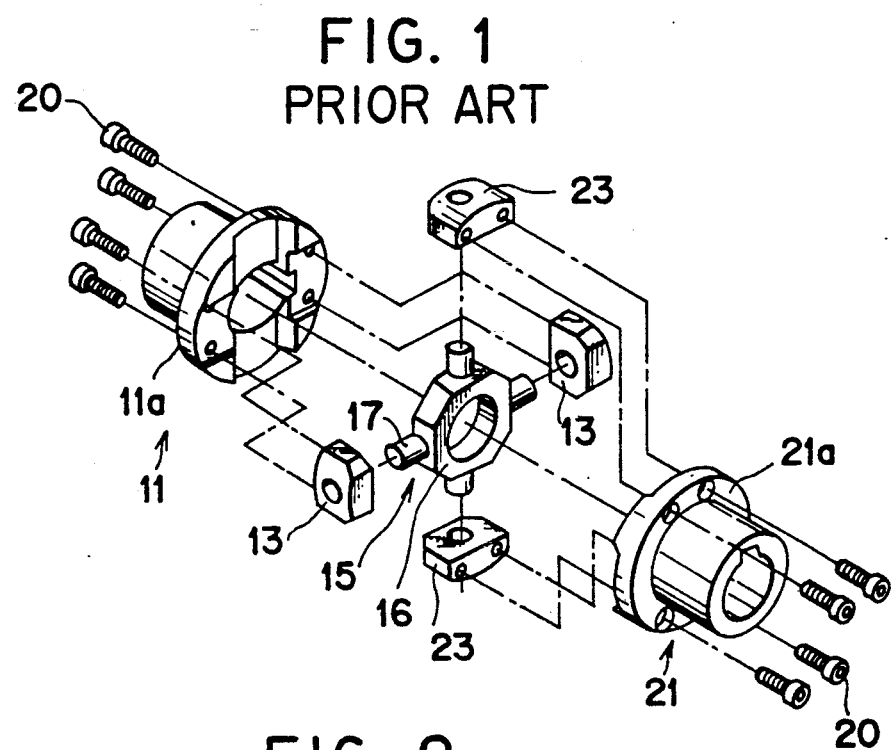
FIG. 1 is an exploded perspective view showing a conventional universal joint.

According to the universal joint of this invention, reduced numbers of mechanical segments are required, i.e., eleven segments are required including two joint bodies 111, 121, four sleeve members 114, 124, a single rectangular segment 116 and four pins 117. On the contrary, in the conventional universal joint shown in FIG. 1, required are twenty-three segments including two hubs, four yokes, four sleeves, one rectangular segment, four pins, eight bolts for fixing the yokes to the hubs. Therefore, in the present invention, assembly work can be easily made at low cost.

Further, in the present invention, since the hubs 112, 122 and the yokes 113, 123 are integrally provided, it is unnecessary to perform machining to the contacting surfaces between the separate hub and yoke which machining has been required in the conventional arrangement. Furthermore, because of the integral structure between the hub and the yoke, the resultant configuration can be simplified, and external appearance can be improved.

Moreover, in the present invention, since the hubs are provided integral with the yokes, indexing work between the pins and the sleeve members force-fitted with the yoke portions can be achieved at high indexing accuracy. Accordingly, assembly error between the pins and sleeve members can be minimized, to thereby improve power transmitting efficiency and service life or durability of the universal joint.

Furthermore, in the present invention, since the pins 117 can be solely machined independent of the rectangular segment 116, machining efficiency and machining accuracy with respect to the pins can be enhanced in comparison with the conventional arrangement in which the pins which have been joined to the rectangular segment must be machined.

While the invention has been described in detail and with reference to a specific embodiment thereof, it would be apparent to those skilled in the art that various changes and modifications can be made therein without departing from the spirit and scope of the invention.

What is claimed is:

1. In a universal joint for use with a first and second rotation shaft, said universal joint including a first joint body provided with a first cylindrical hub portion and a first yoke portion, a second joint body provided with a second cylindrical hub portion and a second yoke portion, and a coupling member for coupling together the first and the second yoke portions therethrough, the improvement comprising:

the first and second yoke portions (113, 123) being provided integrally with the first and second hub portions (112, 122), respectively, and extending from diametrically opposite sides of the hub portions toward each other in axial directions thereof, the first and second yoke portions being formed with first and second pairs of bearing holes (119, 129);

first and second pairs of open ended sleeve members (114, 124) force-fittable with the first and second pairs of bearing holes, respectively;

the coupling member (115) comprising a rectangular segment (116) having four side walls formed with holes (118), and four pins (117) provided separately from the rectangular segment (116) prior to assembly and forcibly fittable into corresponding ones of said holes (118) to provide the coupling member (115) with a cruciform configuration upon assembly, each of the pins (117) being rotatably and axially slidably engaged with each of the sleeve members (114), 124) so as to absorb force generated by an arrangement of said first and second rotation shafts, whereby said first and second joint bodies (111, 121) are coupled together by the coupling member (115).

2. The universal joint as claimed in claim 1, wherein the first and second yoke portions (113, 123) and the first and second hub portions (112,122) are integrally provided by one of a sintering, casting, and injection molding method.

3. The universal joint as claimed in claim 1, wherein the sleeve members (114, 124) are formed of oil-less metal for providing a bearing function relative to the pins (117).

* * * * *